United States Patent

Rice

[11] Patent Number: 5,198,244
[45] Date of Patent: Mar. 30, 1993

[54] RETRACTABLE MOLD PROTRUSION ASSEMBLY

[75] Inventor: Keith A. Rice, Henderson, Ky.

[73] Assignee: American Sheet Extrusion Corporation, Evansville, Ind.

[21] Appl. No.: 874,021

[22] Filed: Apr. 27, 1992

[51] Int. Cl.⁵ .................. B29C 33/02; B29C 33/34
[52] U.S. Cl. ................................ 425/383; 425/457
[58] Field of Search ........................ 425/383, 457

[56] References Cited

U.S. PATENT DOCUMENTS 4,338,070  7/1982  Nava .................... 425/457

Primary Examiner—Willard Hoag
Attorney, Agent, or Firm—Woodard, Emhardt, Naughton, Moriarty & McNett

[57] ABSTRACT

A retractable mold protrusion assembly for thermoforming parts is disclosed which is both self-contained and self-operating. The assembly includes a housing, a protrusion molding member moveably mounted to the housing, and an offset mounted spring. The protrusion molding member is movable with respect to the housing between a locked configuration and a pivoting configuration. When in its locked configuration, the protrusion molding member is securely held in a protruding position in which it protrudes away from the housing. In this position, a piece may be molded about the protrusion molding member to form a desired protrusion in the piece being formed. After molding has been completed, the removal of the molded piece slides the protrusion molding member into a second pivoting configuration, in which the protrusion molding member is pivotable into the housing to allow the molded piece to be completely removed. Continued movement of the molded piece away from the molding assembly then causes the protrusion molding member to pivot into the housing, thus allowing the molded piece to be completely removed. After the molded piece has been removed, the offset mounted spring acts to return the protrusion molding member to its protruding position and to lock it in place, where it is ready for the next subsequent molding operation.

17 Claims, 2 Drawing Sheets

RETRACTABLE MOLD PROTRUSION ASSEMBLY

BACKGROUND OF THE INVENTION

This invention relates generally to male molding members about which a material is formed. In particular, this invention relates to retractable mold protrusion assemblies in which the molding member is capable of retracting so that the molded part can be removed from the mold after being formed.

Items such as refrigerator or freezer door liners are normally shaped using a thermoforming process. Thermoforming consists generally of heating the material to be shaped until the material is sufficiently soft and plastic that it can be shaped. The material is then molded to the desired shape by applying pressure to the material around the mold form, or by drawing a vacuum.

It is common, especially for door liners, to have protrusions of different shapes and sizes extending from the side walls of the molded piece. In the case of refrigerator and freezer door liners, the protrusions are generally for hanging shelf trim or storage bins. After the door liner has been molded and has sufficiently cooled, molding protrusions, about which the protrusions in the door liner have been formed, must be retracted into the molding assembly so that the door liner can be removed from the mold. After the newly molded door liner or other part is cleared from the molding machine, the molding protrusions must return to their original protruding positions in order to form the next part.

It is typical in the industry for the molding protrusions to be operated by cylinders and linkages which hold the protrusion detail in place during forming and which retract the protrusion after the part has been formed to permit the molded part to be removed from the molding machine. This type of apparatus has suffered from the disadvantages of being relatively expensive to make and complex to operate, and is generally limited in its use to the specific machinery into which it has been incorporated. There is a need for a simpler device which is self-contained and self-operating, and which is easily interchangeable among various molding assemblies.

SUMMARY OF THE INVENTION

Generally speaking, the present invention provides a new and unique retractable mold protrusion assembly which is both self-contained and self-operating. The mold protrusion assembly has no mechanical linkages to the molding machine into which it is incorporated and is readily interchangeable between different machines. The protrusion assembly, described and claimed herein, includes a self-contained means for locking the molding protrusion in a protruding position against extreme force for the forming operation, and further incorporates self-contained means for retracting as the molded part is lifted off the mold. Finally, after the molded part has been removed, the mold protrusion automatically returns to its extended position and locks itself into place to complete the molding cycle and prepare for the next part to be molded.

According to the disclosed embodiment, a retractable mold protrusion assembly is provided which includes a housing, a protrusion molding member moveably mounted to the housing, and a biasing means lodged between the housing and the molding member. The protrusion molding member is movable with respect to the housing between a locked configuration and a pivoting configuration. When in its locked configuration, the protrusion molding member is securely held in a protruding position in which it protrudes away from the housing. In this position, a piece may be molded about the protrusion molding member to form a desired protrusion in the piece being formed. After molding has been completed, the removal of the molded piece slides the protrusion molding member into a second pivoting configuration, in which the protrusion molding member is pivotable into the housing to allow the molded piece to be completely removed. Continued movement of the molded piece away from the molding assembly then causes the protrusion molding member to pivot into the housing, thus allowing the molded piece to be completely removed. After the molded piece has been removed, biasing means within the housing acts to return the protrusion molding member to its original locked configuration, where it is ready for the next subsequent molding operation.

One object of the present invention is to provide an improved retractable mold protrusion assembly.

Another object of the present invention is to provide a retractable mold protrusion assembly which is self-contained and which includes no mechanical linkages to the molding machine into which it is mounted.

Still another object of the present invention is to provide a self-contained retractable mold protrusion assembly which is readily interchangeable between molding machines and molds.

Related objects and advantages of the present invention will be apparent from the following description.

DESCRIPTION OF THE PREFERRED EMBODIMENT

Figure 1:
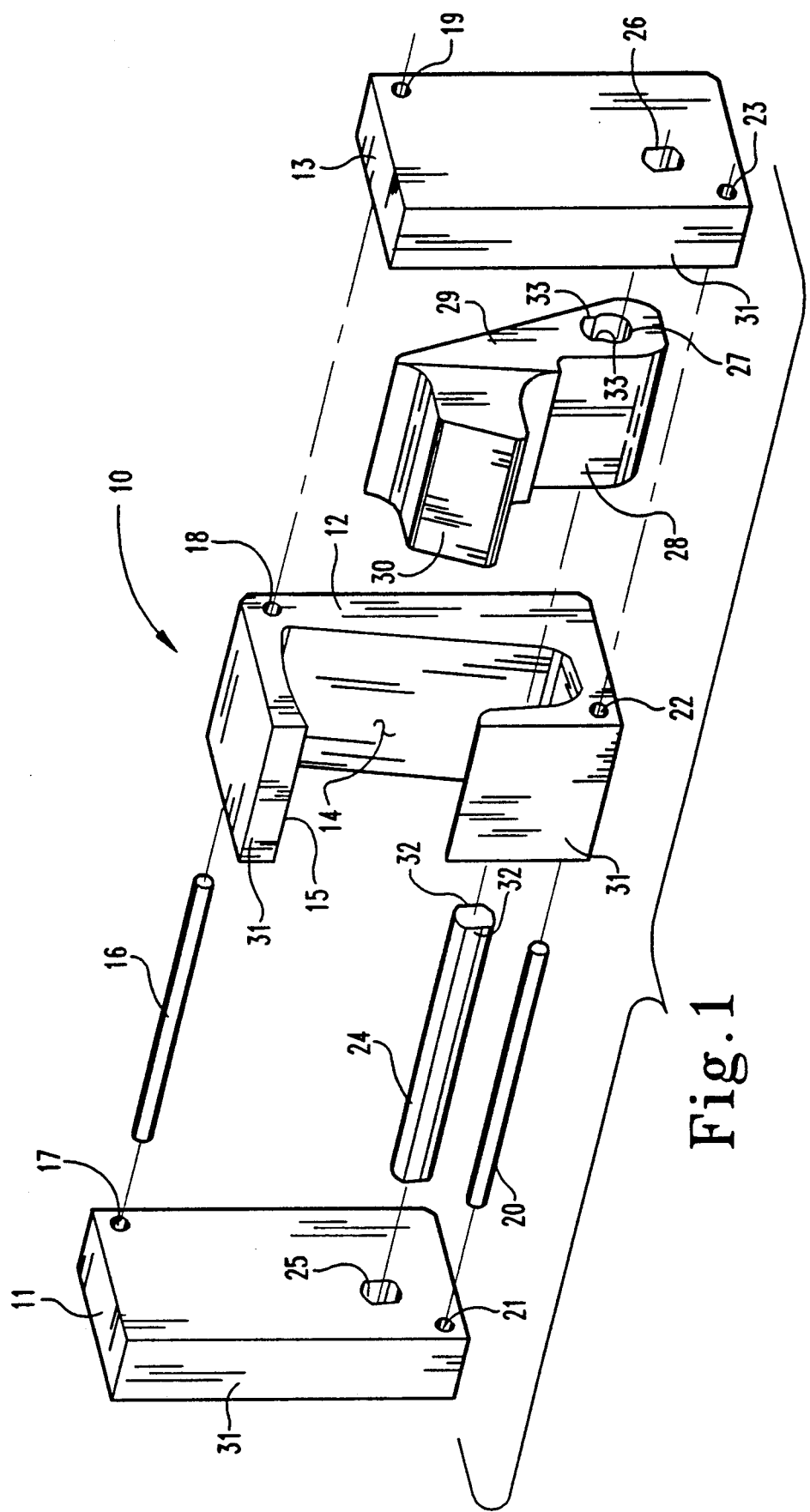
FIG. 1 is an exploded isometric view of a retractable mold protrusion assembly according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown an exploded view of a retractable mold protrusion assembly 10 according to one embodiment of the present invention. The assembly includes a housing made up of left-hand portion 11, center portion 12 and right-hand portion 13. Each portion of the housing includes two bores which may be aligned with the corresponding bores of the other portions, and the housing can be held together by a pair of dowel pins, which are inserted through the bores. In particular, bore 17 lines up with bore 18 which in turn lines up with bore 19, and the portions are held together when dowel pin 16 is inserted therethrough. Likewise, bores 21, 22 and 23 of the respective portions are aligned and dowel pin 20 is inserted therethrough. The bores are sized so that dowel pins 16 and 20 are snugly received therein preventing the respective portions 11, 12 and 13 from coming apart once assembled. The assembled housing defines molding surface 31, which has an opening 15 therein entering into cavity 14.

Left-hand portion 11 and right-hand portion 13 of the housing also include shaped bores 25 and 26, respectively. Shaped bores 25 and 26 are cut to correspond to the cross section of keyed pin 24. When the housing is assembled, each corresponding end of keyed pin 24 is received in one of the shaped bores 25 or 26 such that keyed pin 24 spans cavity 14 of the housing. The shape and size of shaped bores 25 and 26 are such that keyed pin 24 is snugly received therein and is prevented from rotating with respect to the housing. Protrusion assembly 10 is completed when molding member 28 is mounted on keyed pin 24 between left-hand portion 11 and right-hand portion 13 and a compression spring (not shown, but see FIGS. 2-5) is lodged within the cavity between molding member 28 and the centerportion 12 of the housing. In this way, keyed pin 24 is received through keyed bore 27 of molding member 28. Molding member 28 includes base portion 29 which is normally concealed within cavity 14 of the housing, and also includes protrusion 30 which protrudes away from molding surface 31 of the housing during the mold-forming procedure, and which retracts into cavity 14 after molding to allow the formed piece to be removed.

Keyed pin 24 has two opposing parallel planar surface portions 32, and is otherwise essentially cylindrically shaped. Keyed bore 27 has an elongate portion which includes a pair of opposing parallel planar surfaces 33 that correspond substantially to planar portions 32 of keyed pin 24, and is otherwise essentially cylindrical in shape corresponding to the cylindrically shaped portion of keyed pin 24. Cavity 14 of the housing is sized such that molding member 28 is able to pivot about keyed pin 24 when keyed pin 24 is aligned with the circular portion of keyed bore 27. Cavity 14 of the housing is also sized so that molding member 28 is able to move in a direction substantially perpendicular to a pivot axis defined by keyed bore 24 such that planar portions 32 engage planar portions 33 of keyed bore 27 preventing molding member 28 from pivoting about keyed pin 24. When molding member 28 is pivoted to its retracted position about keyed pin 24, protrusion 30 is substantially received within cavity 14 of the housing.

Figure 2:
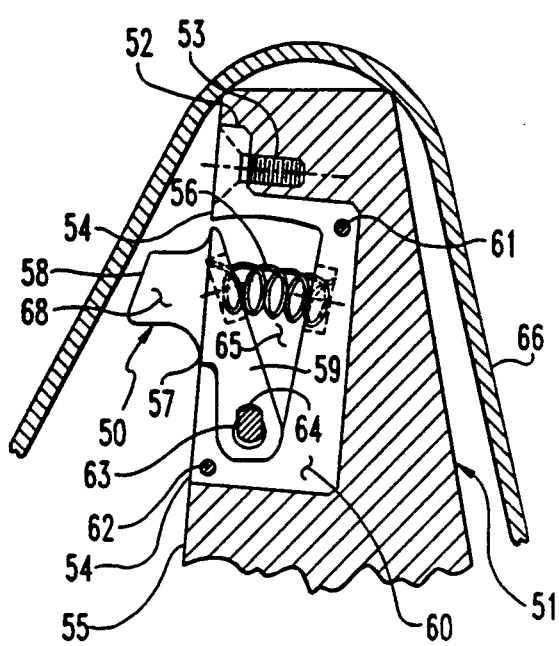
FIG. 2 is a partial section side elevational view of a retractable mold protrusion assembly according to the present invention, mounted into a molding form and with an unmolded part positioned thereabout at the beginning of the thermoforming process.

The action of the present invention is illustrated in FIGS. 2-5, which show in sequence a thermoforming process cycle utilizing the present invention. Retractable mold protrusion assembly 50 is similar to the embodiment previously described except that it includes an additional flange 52 which defines a countersunk bore to receive a screw 53 therethrough. Protrusion assembly 50 is shown flush-mounted via screw 53 into form 51 of a thermoforming machine (not shown). Protrusion assembly 50 includes a compression spring 56 mounted in cavity 65 between protrusion molding member 57 and housing 60. FIG. 2 shows the first step in the thermoforming cycle, in which unformed part 66 is placed adjacent form 51 and protrusion assembly 50 after the previously molded part has been removed from the molding machine. After the previously molded part was removed from the form, spring 56 caused protrusion molding member 57 to return to its protruding position in which keyed keyed pin 63 is at least partially engaged with the planar portions of keyed bore 64 such that the molding member is in its locked configuration.

This engagement of the keyed pin 63 with keyed bore 64 results from the action caused by the relative orientation of spring 56. It has been found that when the ends of spring 56 are mounted in an offset fashion as shown, the return action of spring 56 has a transverse component which tends to force protrusion molding member 57 in a direction transverse to the axis defined by keyed pin 63 such that the planar portions of the pin engage the planar portions of keyed bore 64, thus locking protrusion molding member 57 back into place in its locked configuration. In this way, this offset mounting results in the spring having the ability to both return protrusion 58 to its protruding position and also to return protrusion molding member 57 back to its locked configuration relative to the housing.

Like the embodiment discussed earlier, retractable mold protrusion assembly 50 includes a housing 60 which is actually three different portions held together by dowel pins 61 and 62. Protrusion molding member 57 includes base portion 59 which is normally disposed within cavity 65 of housing 60, and protrusion 58 which protrudes away from molding surface 54 of housing 60. Protrusion assembly 50 is mounted in form 51 such that molding surface 54 of housing 60 is flush with molding surface 55 of form 51. Assembly 50 is shown attached to form 51 with screw 53, but could equally well be attached by other fastening means which are well known in the art.

Figure 3:
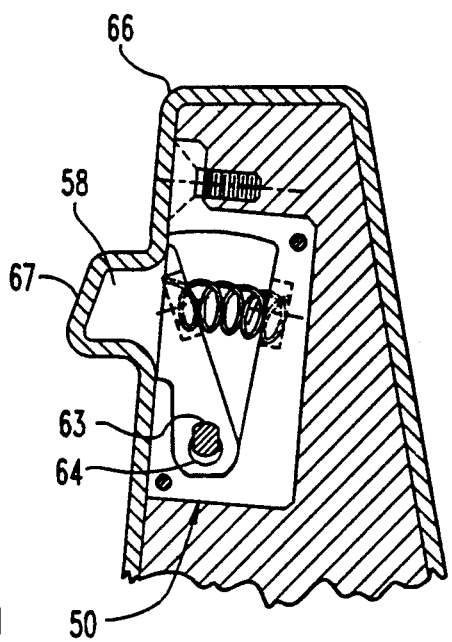
FIG. 3 shows the retractable mold protrusion assembly of FIG. 2, with protrusion molding member 57 in a locked, protruding configuration, and with a part being formed thereabout.

FIG. 3 shows part 66 after it has been heated and thermoformed against form 51 and retractable mold protrusion assembly 50. As the thermoforming process begins, part 66 comes in contact with protrusion 58 of protrusion molding member 57, biasing it to move with respect to housing 60 in a direction that is transverse to the pivot axis defined by keyed pin 63, and against the engagement between the opposing parallel planar surface portions of keyed pin 63 and the corresponding parallel planar surface portions of keyed bore 64. With the planar portions of keyed pin 63 so engaged with the planar portions of keyed bore 64, protrusion molding member 57 is in its locked configuration such that it is prevented from pivoting and is instead held substantially rigid against the pressure applied during the thermoforming procedure. Molded protrusion 67 is formed on part 66 because keyed pin 63 holds protrusion molding member 57 locked in the protruding position in this way, as shown in FIG. 3.

Figure 4:
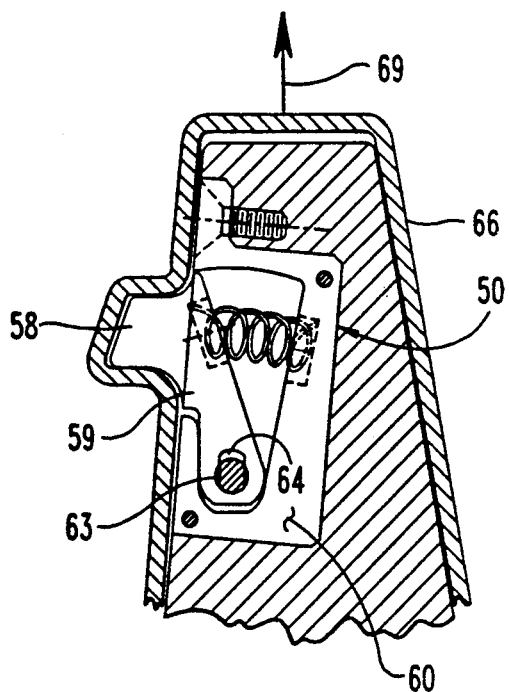
FIG. 4 shows the retractable mold protrusion assembly of FIGS. 2 and 3 as the formed part is being removed causing protrusion molding member 57 to move into to its pivoting configuration.

After part 66 has been allowed to cool to a substantially rigid state, it is ready to be removed from form 51. Formed part 66 is removed from form 51 simply by lifting the part in the direction 69 off of form 51. As part 66 begins to be lifted off of form 51 as shown in FIG. 4, molded protrusion 67 engages protrusion 58 of protrusion molding member 57 causing protrusion molding member 57 to move within cavity 65 in a direction substantially perpendicular to the pivot axis defined by keyed pin 63. When part 66 is moved with respect to form 51 a sufficient distance as shown in FIG. 4, the planar portions of keyed pin 63 disengage from the planar portion of keyed bore 64, so that protrusion molding member 57 becomes pivotable about keyed pin 63. In this way, the lifting of part 66 off of form 51 causes protrusion molding member 57 to move from its locked configuration shown in FIG. 3 to a pivoting configuration as shown in FIG. 4.

Figure 5:
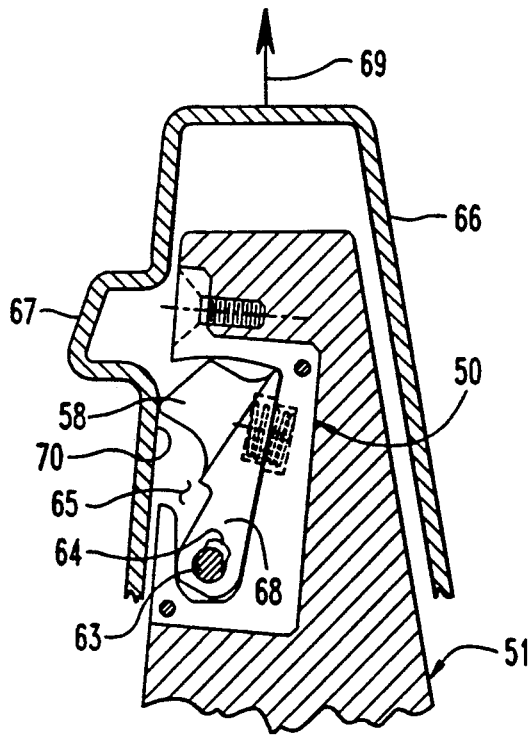
FIG. 5 shows the retractable mold protrusion assembly of FIGS. 2-4 after protrusion molding member 57 has been pivoted into its retracted position.

As part 66 is further removed from form 51 in the direction of arrow 69, protrusion molding member 57 is caused to pivot about keyed pin 63 to permit part 66 to be completely removed, thus completing the thermoforming cycle. As part 66 is removed, its inner surface 70 rides against protrusion 58 of protrusion molding member 57 causing it to pivot back to its retracted position as shown in FIG. 5 against the action of compression spring 56. When part 66 is completely removed from form 51, compression spring 56 causes protrusion molding member 57 to pivot back about keyed pin 63 from its retracted position to its protruding position as shown in FIG. 2 with the keyed pin 63 at least partially engaged with keyed bore 64. In this way, spring 56 provides a biasing means for returning protrusion molding member 57 from its retracted position to its locked configuration. The thermoforming cycle is then complete and the assembly is ready to mold a new part.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A retractable mold protrusion assembly comprising:
    a housing having a molding surface, a cavity therein, and an opening into said cavity through said molding surface;
    a protrusion molding member mounted to said housing and having a protrusion, said protrusion molding member being movable with respect to said housing between:
    a locked configuration in which said protrusion molding member is securely held in a protruding position such that said protrusion protrudes away from said molding surface of said housing and wherein a piece may be molded about said protrusion to form a desired protrusion in the piece being formed, and a pivoting configuration in which said protrusion molding member is pivotable about a pivot axis with respect to said housing to a retracted position such that at least a part of said protrusion is received within said cavity when said molding member is pivoted to said retracted position; and
    biasing means for returning said molding member to said locked configuration from said retracted position.

2. The retractable mold protrusion assembly of claim 1 wherein said molding member is movable between said locked configuration and said pivoting configuration in the direction of removal of a piece molded about said protrusion.

3. The retractable mold protrusion assembly of claim 1 wherein said molding member is movable between said locked configuration and said pivoting configuration in a direction substantially transverse to said pivot axis.

4. The retractable mold protrusion assembly of claim 2 wherein one of said housing or said molding member includes a keyed pin which defines said pivot axis; and the other of said housing or said molding member defines a keyed bore which receives at least a portion of said keyed pin therein.

5. The retractable mold protrusion assembly of claim 4 wherein said keyed pin includes a first pair of planar surfaces; said keyed bore includes a second pair of planar surfaces which engage said first pair of planar surfaces when said molding member is in said locked configuration; and said first planar surfaces being disengaged from said second planar surfaces when said molding member is moved from said locked configuration to said pivoting configuration.

6. The retractable mold protrusion assembly of claim 5 wherein said keyed pin is fixedly mounted on said housing; and said molding member includes said keyed bore.

7. The retractable mold protrusion assembly of claim 6 wherein said first pair of planar surfaces are substantially parallel; and said second pair of planar surfaces are substantially parallel.

8. The retractable mold protrusion assembly of claim 7 wherein said biasing means is a compression spring lodged between said housing and said molding member.

9. The retractable mold protrusion assembly of claim 8 wherein said compression spring has end coils and defines a spring axis such that said end coils are colinear with said spring axis when said spring is undistorted; and said spring is distorted when lodged between said housing and said molding member such that at least one of said end coils is offset from said spring axis.

10. The retractable mold protrusion assembly of claim 8 wherein the return action of said compression spring has a transverse component relative to said pivot axis which tends to force said protrusion molding member in a direction transverse to the said pivot axis and back into place in said locked configuration.

11. The retractable mold protrusion assembly of claim 8 wherein said compression spring is lodged between said housing and said molding member in an offset mounted configuration causing the return action of said compression spring to have a transverse component relative to said pivot axis which tends to force said protrusion molding member in a direction transverse to the said pivot axis and back into place in said locked configuration.

12. A self contained and self actuating retractable mold protrusion assembly comprising:
    a housing having a molding surface, a cavity therein, and an opening to said cavity through said molding surface;
    a protrusion molding member mounted to said housing and having a protrusion, said protrusion molding member being movable with respect to said housing between:
    a locked configuration in which said protrusion molding member is securely held in a protruding position such that said protrusion protrudes away from said molding surface of said housing and wherein a piece may be molded about said protrusion to form a desired protrusion in the piece being formed, and a pivoting configuration in which said protrusion molding member is pivotable about a pivot axis with respect to said housing to a retracted position in which said protrusion is substantially received within said cavity;

self actuating means for retracting said protrusion into said cavity after a molded piece has been formed about said protrusion, said retracting means including said protrusion molding member being slidable with respect to said housing from said locked configuration in the direction of removal of said molded piece such that the removal of said molded piece causes said protrusion molding member to slide from said locked configuration into said pivoting configuration in which the protrusion molding member is pivotable into said housing, and wherein continued movement of the molded piece away from the molding assembly then causes the protrusion molding member to pivot into said retracted position within said housing to allow the molded piece to be completely removed; and biasing means for returning said molding member to said locked configuration from said retracted position upon the removal of said molded piece.

13. The retractable mold protrusion assembly of claim 12 wherein said biasing means is a compression spring lodged between said housing and said molding member.

14. The retractable mold protrusion assembly of claim 12 wherein said molding member is movable between said locked configuration and said pivoting configuration in a direction substantially transverse to said pivot axis.

15. The retractable mold protrusion assembly of claim 14 wherein said biasing means is a compression spring lodged between said housing and said molding member.

16. The retractable mold protrusion assembly of claim 15 wherein the return action of said compression spring has a transverse component relative to said pivot axis which tends to force said protrusion molding member in a direction transverse to the said pivot axis and back into place in said locked configuration.

17. The retractable mold protrusion assembly of claim 15 wherein said compression spring is lodged between said housing and said molding member in an offset mounted configuration causing the return action of said compression spring to have a transverse component relative to said pivot axis which tends to force said protrusion molding member in a direction transverse to the said pivot axis and back into place in said locked configuration.

* * * * *